(12) United States Patent
Jahromi

(10) Patent No.: US 10,502,530 B1
(45) Date of Patent: Dec. 10, 2019

(54) RIFLESCOPE WITH ATTACHABLE AIMING CORRECTOR AND METHOD FOR USING SAME

(71) Applicant: Omid S Jahromi, Playa Vista, CA (US)

(72) Inventor: Omid S Jahromi, Playa Vista, CA (US)

(73) Assignee: Lucida Research LLC, Playa Vista, CA (US)

( * ) Notice: Subject to any disclaimer, the term of this patent is extended or adjusted under 35 U.S.C. 154(b) by 0 days.

(21) Appl. No.: 15/990,815

(22) Filed: May 28, 2018

(51) Int. Cl.
| | | |
|---|---|---|
| *F41G 1/38* | (2006.01) | |
| *F41G 3/12* | (2006.01) | |
| *G02B 23/16* | (2006.01) | |
| *G02B 23/02* | (2006.01) | |
| *F41G 1/30* | (2006.01) | |

(52) U.S. Cl.
CPC ............ *F41G 3/12* (2013.01); *F41G 1/30* (2013.01); *F41G 1/38* (2013.01); *G02B 23/02* (2013.01); *G02B 23/16* (2013.01)

(58) Field of Classification Search
CPC . F41G 1/38; F41G 1/387; F41G 1/393; F41G 1/3935; G02B 23/02; G02B 23/04; G02B 23/06; G02B 23/10
See application file for complete search history.

(56) References Cited

U.S. PATENT DOCUMENTS

| | | | |
|---|---|---|---|
| 8,363,321 B1 * | 1/2013 | Pochapsky | G02B 5/06 359/554 |
| 8,749,887 B2 | 6/2014 | Jahromi | |
| 9,164,269 B1 | 10/2015 | Jahromi | |
| 9,644,920 B2 * | 5/2017 | Jahromi | F41G 1/38 |
| 2005/0039370 A1 | 2/2005 | Strong | |

FOREIGN PATENT DOCUMENTS

EP           1930760 A1 *  6/2008  ............ G02B 23/02

* cited by examiner

*Primary Examiner* — Stephen Johnson

(57) ABSTRACT

This invention discloses a riflescope wherein the point of aim is adjusted by attaching one or more corrector wedge prisms in front of the objective. Each wedge prism shifts the point of aim by a predetermined amount such as 5 cm at 100 m or 10 cm at 100 m, etc. A shooter can zero-in his rifle by first firing a set of test shots to determine how far off the bullets hit from the desired point of impact. He then selects one or more wedge prisms supplied with the riflescope and attaches them to its front side. The wedge prisms correct the riflescope's point of aim and bring it in alignment with the the rifle's point of impact.

The riflescope introduced in this invention has no moving parts, no turrets and no off-axis optical components. There is no possibility of it's point of aim shifting due to rifle's recoil force or other vibrations. Additionally, the riflescope has a streamlined body which is aesthetically pleasing and also suitable for adding auxiliary sights such as a reflector sight.

8 Claims, 12 Drawing Sheets

RIFLESCOPE WITH ATTACHABLE AIMING CORRECTOR AND METHOD FOR USING SAME

I. CROSS-REFERENCE TO RELATED APPLICATIONS

Not Applicable.

II. FIELD OF THE INVENTION

This invention relates to optical weapon sights such as riflescopes which superimpose a reticle pattern on an image of the target.

III. BACKGROUND OF THE INVENTION

A riflescope (also called a "scope" for short) is an optical weapon sight based on the Keplerian telescope. In its most basic form, a riflescope is a Keplerian telescope with a reticle or cross hairs added to mark the "point of aim". A riflescope must be mounted on a rifle such that its aiming axis (optical axis) is aligned with the rifle's barrel. However, due to mechanical tolerances, it is hardly possible to achieve a precise alignment the first time a riflescope is mounted on a rifle. The trajectory of the bullet must also be considered so additional corrections in the vertical direction might be necessary depending on target distance. In view of these considerations, riflescopes include means for precise vertical (elevation) and horizontal (windage) adjustments to the point of aim. The process of adjusting or correcting the point of aim of a riflescope so that the point of aim and point of impact coincide is called "zeroing-in". Since a rifle's bullet follows a ballistic trajectory, a rifle is zerod-in at a known distance, say 100 m. At other distances, the rifle will shoot a predictable amount above or below the point of aim.

Early riflescopes were equipped with an external-adjustment system built into the mounts. Their point of aim was adjusted by mounts having micrometer windage and elevation mechanisms that moved the entire scope laterally and/or vertically. An advantage of external-adjustment scopes is that all the lens elements and the reticle remain centered on the same optical axis, providing highest image quality. The disadvantage of the external-adjustment mechanism is that the mounts must be able to support the entire weight of the riflescope under recoil. The external adjust mechanism is also bulky, heavy and susceptible to mud and dirt when used in the field.

Most modern riflescopes have an internal-adjustment mechanism using threaded screws mounted in turrets. The screws are connected to external knobs which are accessible by the shooter. Turning the knobs moves the reticle assembly inside the main tube against spring pressure. The knobs have clearly marked graduations around their circumference and many have a ball-detent system that clicks as the adjustment screws are turned. Each graduation or click represents a change in reticle position such that the point of aim is shifted by a small amount on the target. In modern riflescopes the graduations are commonly expressed as 1 cm at 100 m or 0.5 inch at 100 yards. The graduations may also be expressed in minutes of arc (MOA) or milliradians (mil). For the purpose of zeroing-in a rifle, 1 MOA is considered to be equal to 1 inch at 100 yards. Similarly, 0.1 mil corresponds to 1 cm at 100 m. These conventions are used in the present invention as well.

The opto-mechanical design of a riflescope with internal-adjustment mechanism is shown in FIG. 1. With reference to this figure, a riflescope is comprised of an objective lens 1 which forms a real image of the target at its focal plane. The image produced by the objective lens is upside down and laterally reversed. An image-erecting system comprising a pair of converging lenses 3a and 3b converts the image formed by the objective lens into an upright and laterally correct real image. An eyepiece lens 5 receives the image produced by the erector system and converts it into a magnified virtual image for the shooter to see.

FIG. 1 shows the reticle 20 being mounted coplanar with the objective focal plane. It is also possible to mount the reticle at the eyepiece focal plane. In either case, the shooter will see an image of the reticle superimposed on the image of the target.

The erector lenses 3a and 3b are mounted inside an inner tube 6 which is attached to the main riflescope housing 30 via a hinge 37. The inner tube 6 is able to tilt in both vertical and horizontal directions. The front section of the inner tube 6 is supported by the elevation knob 38 and the windage knob 39 against the pressure of a leaf spring 9 (see FIGS. 1 and 2). The purpose of this arrangement is to force the erector assembly to move together with the reticle so that the reticle always appears centered when viewed through the eyepiece. The reader is referred to U.S. Pat. No. 2,955,512 granted to Ernst Kollmorgen and John L Rawlings on Oct. 11, 1960 and U.S. Pat. No. 3,161,716 granted to D. J. Burris et al. on Dec. 15, 1964 for original disclosures of this mechanism.

Since its original invention more than 60 years ago, the mechanism described above has become the most widely used method for elevation and windage adjustment in riflescopes. Nevertheless, it has several fundamental limitations:

i. When the inner tube 6 is tilted to provide elevation or windage adjustment, the erector lenses 3a and 3b become decentered with respect to the objective optical axis. In telescope design, decentering the lenses is a fatal flaw: various optical abberations such as coma and astigmatism will be introduced and image sharpness is lost.

ii. The hinge 37 must provide two degrees of freedom and must be very precise. It is difficult and costly to make a precise hinge that can hold the rear end of the inner tube 6 at precisely the same position during elevation and windage adjustments or when the rifle recoils.

iii. The leaf spring 6 has very little room for compression and expansion. The spring pressure can change by temperature variations or other factors. The spring's point of contact with the inner tube 6 also shifts depending on the amount of elevation or windage adjustment applied (See FIG. 2).

iv. The bottom surface of elevation and windage knobs can touch (i.e. hold and support) the inner tube 6 only at a single point of contact once the inner tube is tilted. Furthermore, these points of contact shift around depending on the amount of elevation or windage adjustment applied (See FIG. 2).

v. The standard diameter for a riflescope's main tube is 1 inch in the USA and 30 mm in European countries that use the metric system. As a result, the gap between the inner tube 6 and the main riflescope housing 30 is only a couple of millimetres. This limits the range of horizontal or vertical shift that can be applied to the reticle (See FIG. 2) which in turn limits the maximum elevation adjustment that can be dialed in the riflescope.

As far as the author knows, no remedy for weakness 'i' has been devised by the industry. As a result of weaknesses 'ii', 'Hi' and 'iv', elevation and windage adjustments in many of the riflescopes currently on the market are not repeatable. (In the hunting literature, this problem is known as "zero retention problem" or "tracking problem".) To get around weakness 'v', some manufacturers have started manufacturing riflescopes with large-diameter main tubes (34 mm and even 36 mm). This practice has added significant bulk to their riflescope and has made mounting the riflescopes difficult as they no longer fit standard mounting bases and rings (which are either 1 inch or 30 mm).

In recent years, several optical adjustment mechanisms have been invented by the present author to replace the mechanical adjustment mechanism described above. U.S. Pat. No. 8,749,887 issued on Jun. 10, 2014 describes a riflescope wherein a pair of movable wedge prisms are positioned between the objective lens and its focal plane. U.S. Pat. No. 9,164,269 issued on Oct. 20, 2015 and U.S. Pat. No. 9,644,620 issued on May 9, 2017 describe mechanisms that utilize tiltable and rotatable wedge prisms for adjusting the point of aim in a riflescope.

The present invention discloses a simpler design: the point of aim is adjusted by attaching one or more wedge prisms in front of the objective. The prisms are fixed and the riflescope has no moving parts.

IV. SUMMARY OF THE INVENTION

The present invention teaches a riflescope wherein the reticle and other optical elements are fixedly mounted inside the riflescope. The riflescope's point of aim is adjusted by attaching one or more wedge prisms in front of the objective. The invention also introduces a method for adjusting the point of aim of an optical sight which includes attaching one or more thin wedge prisms to the front of the optical sight.

V. BRIEF DESCRIPTION OF THE DRAWINGS

The foregoing aspects and many of the attendant advantages of this invention will become more readily apparent with reference to the following detailed description of the invention, when taken in conjunction with the appended claims and accompanying drawings, wherein:

Figure 6A:
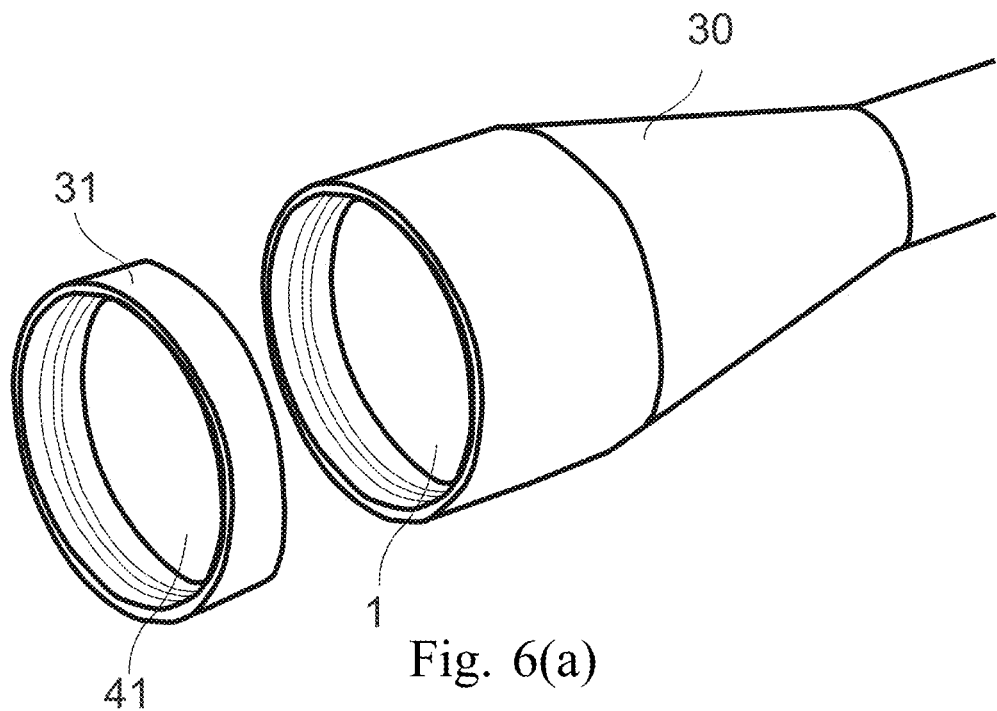
Figure 6B:
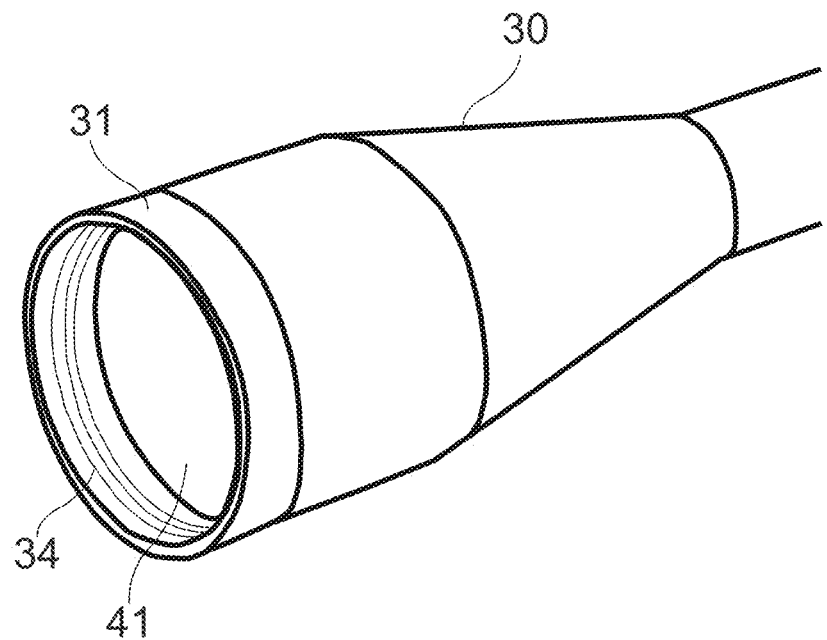

FIGS. 6(a) and (b) are perspective-view diagrams showing how wedge prisms are attached in front of the objective lens according to a first preferred embodiment of the invention.

Figure 7:
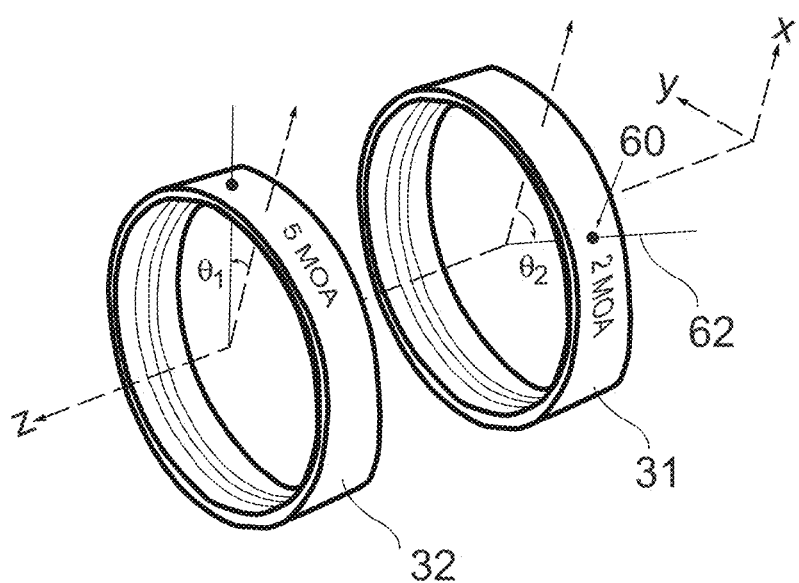

FIG. 7 is a perspective-view diagram showing the deviation axis and the deviation power being marked on the housing of the wedge prisms. This figure also shows how the deviation axes of wedge prisms can be oriented in a desired direction in the x-y plane.

Figure 8:
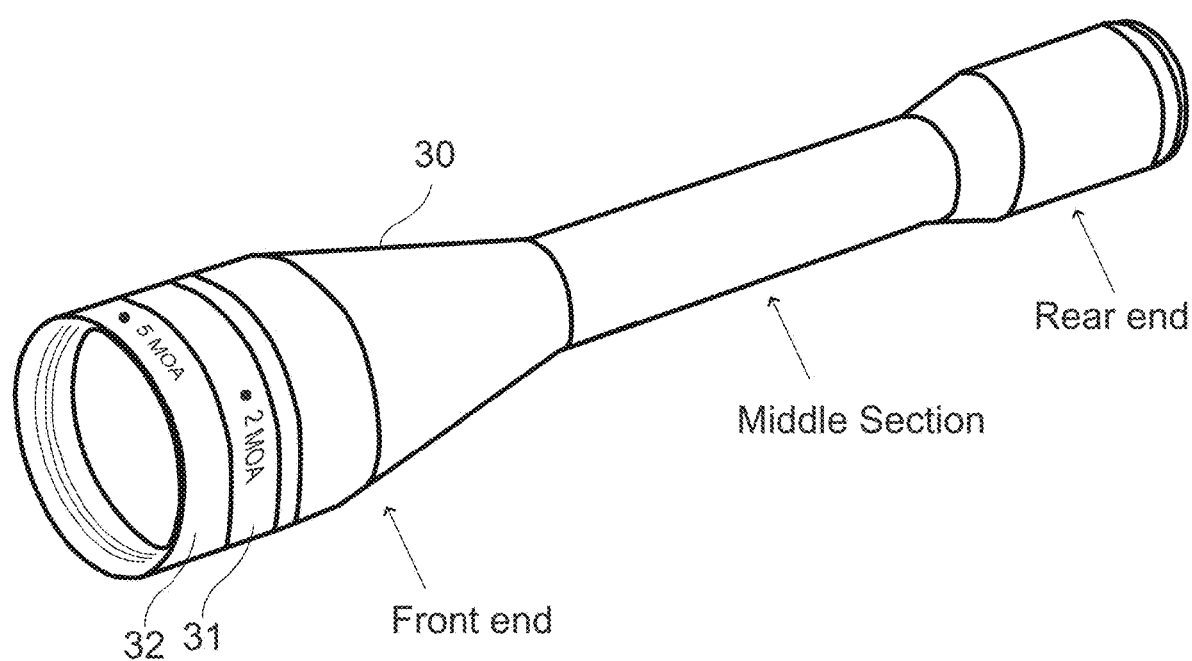

FIG. 8 is a perspective-view diagram showing the turret-less riflescope with wedge prisms being attached to the front of the objective lens. (Note how the main body of the riflescope is smooth and streamlined and no turrets are attached to the middle section.)

Figure 9:
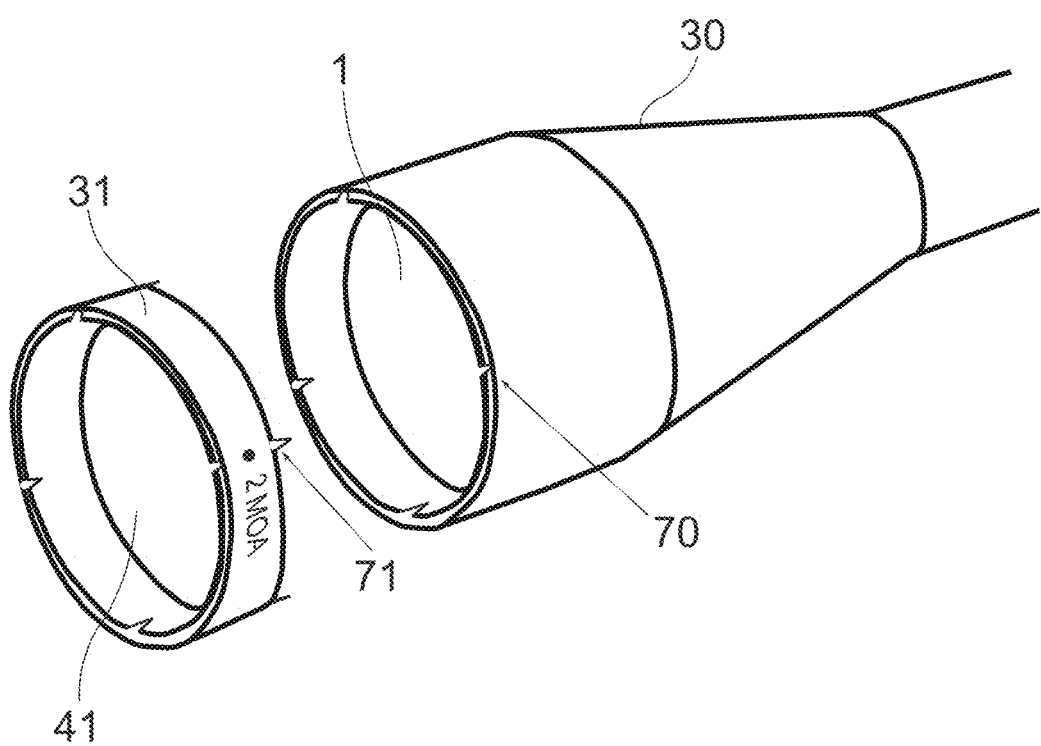

FIG. 9 is a perspective-view diagram showing a variation of the invention wherein the deviation axes of the wedge prisms are oriented horizontally or vertically.

Figure 10:
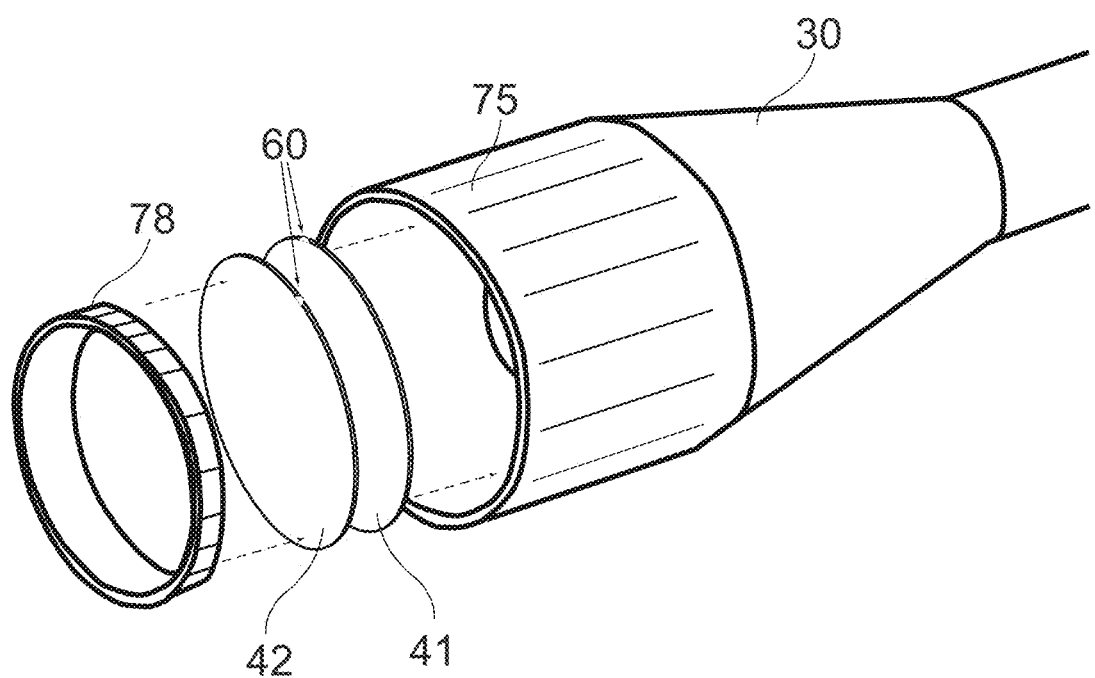

FIG. 10 is a perspective-view diagrams showing a variation of the invention wherein one or more wedge prisms are put inside a cylindrical compartment in front of the objective lens and securely fastened using a retaining ring.

Figure 11A:
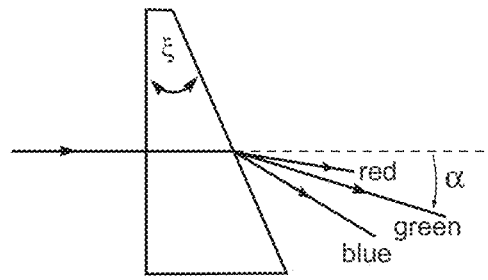

FIG. 11(a) shows color dispersion caused by a wedge prism.

Figure 11B:
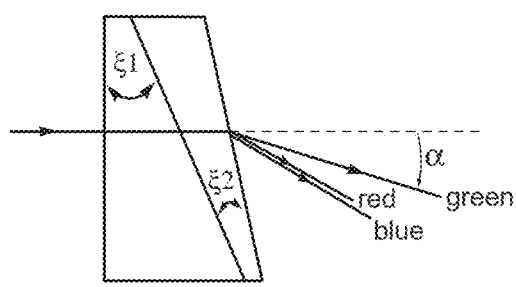

FIG. 11(b) shows how color dispersion can be reduced by using an achromatic wedge prism.

Figure 12A:
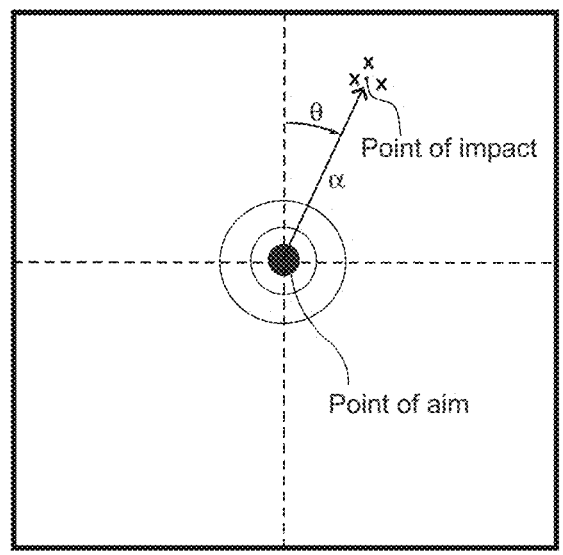

FIG. 12(a) shows a method for determining aiming error using the polar coordinate system.

Figure 12B:
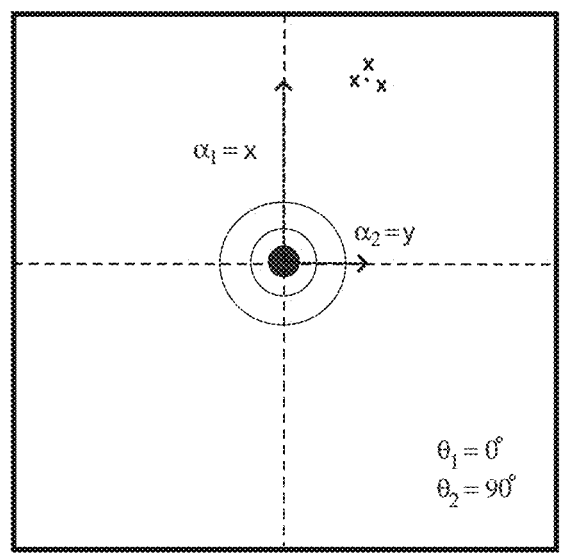

FIG. 12(b) shows a method for determining aiming error using the Cartesian coordinate system.

Figure 12C:
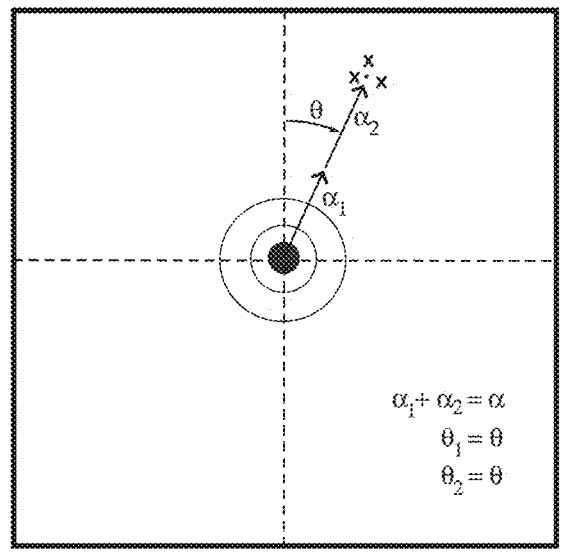

FIG. 12(c) shows a preferred method for zeroing-in the riflescope according to the invention.

Figure 12D:
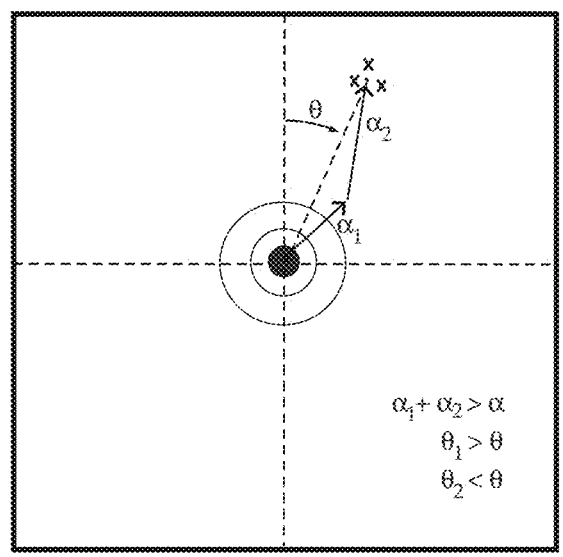

FIG. 12(d) shows another preferred method for zeroing-in the riflescope according to the invention.

VI. DETAILED DESCRIPTION OF THE INVENTION

A. Principle of Operation

Figure 3A:
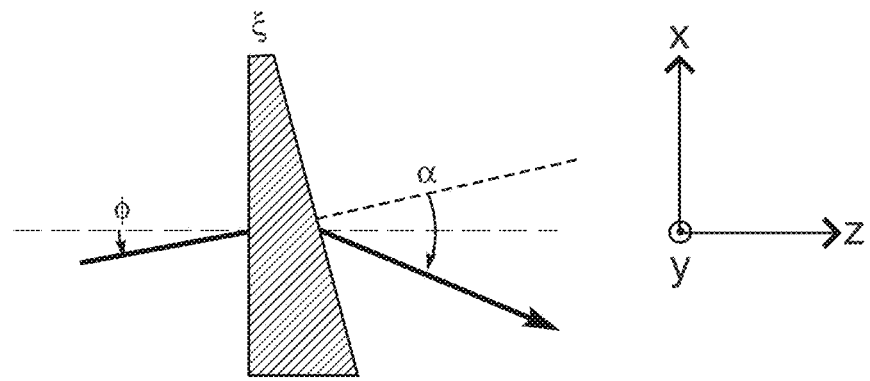
FIG. 3(a) is a side-view diagram showing the the principle of light deviation by a thin wedge prism.

This invention uses the principle of light refraction by thin wedge prisms. When a ray of light enters a transparent material, the ray's direction is deflected, based on both the entrance angle (typically measured relative to the normal to the surface) and the material's refractive index (Snell's Law). A beam passing through a wedge prism is deflected twice: once entering, and again when exiting. The sum of these two deflections is called the deviation angle (FIG. 3(a)).

It follows from Snell's Law that for a wedge prism, the beam deviation angle depends on the incidence angle:

$$\alpha = \phi - \xi + \sin^{-1}\left(\sqrt{n^2 - \sin^2\phi} \times \sin\xi - \sin\phi\cos\xi\right). \tag{1}$$

In the above formula a is the beam deviation angle, is the apex angle of the prism, $\phi$ is the incidence angle of the incoming beam and n is the index of refraction of the glass material used for making the prism. When the incident light is close to normal to the prism surface (i.e. $\phi \approx 0$) and for a thin prism (i.e. $\xi \leq 6°$), the formula (1) reduces to $$\alpha \approx (n-1)\xi. \tag{2}$$

Therefore, for thin wedge prisms the deviation angle $\alpha$ is practically independent of the incidence angle and is solely determined by the prism's apex angle and glass type. In this invention, the deviation angle $\alpha$ is also called "deviation power" or "deviation magnitude" associated with a thin wedge prism. For the purposes of this invention, the wedge prisms will be designed such that their deviation powers $\alpha_i$ will be a fraction of a degree. Example values are 1 MOA, 2 MOA, and 5 MOA.

Figure 4:
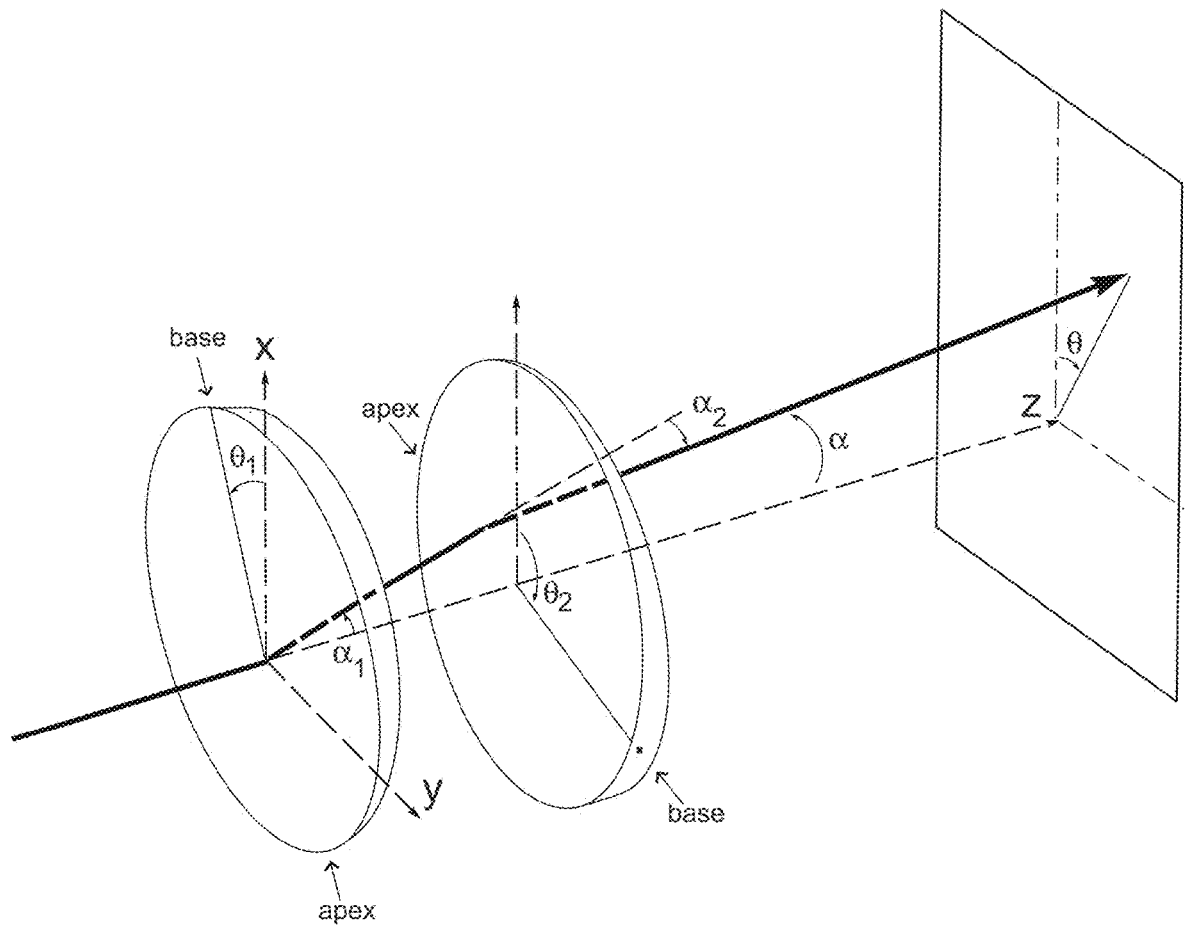
FIG. 4 is a perspective-view diagram showing vector addition of deviation powers of thin wedge prisms in three-dimensional space.

A wedge prism deflects light towards its base. Therefore, we define a hypothetical axis which connects the apex of the prism to its base, as its "deviation axis". The "deviation direction" or "deviation orientation" $\theta$ of the prism is defined as the angle between the prism's deviation axis and the vertical axis (x axis as shown in FIGS. 4 and 7).

Figure 3B:
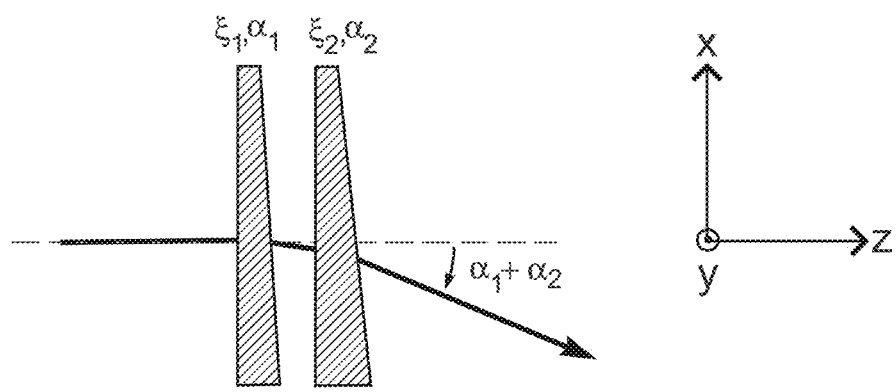
FIG. 3(b) is a side-view diagram showing algebraic addition of deviation powers of thin wedge prisms in two-dimensional space.

If two or more thin wedge prisms are stacked together, their deviation powers will be additive. FIG. 3(b) shows a simple (two-dimensional) example of this additive property. In this figure, two thin wedge prisms are stacked such that their apex points towards the x direction. In this case, the total deviation power $\alpha$ will be the algebraic sum of the deviation powers of each prism: $\alpha = \alpha_1 + \alpha_2$.

In three dimensional space, it is possible to orient a thin wedge prism such that its deviation axis points to any direction in the x-y plane. In this case, the total deviation provided by the prisms will be the vector sum of the deviation provided by each individual prism. With reference to FIG. 4, let $a_1 = (\alpha_1, \theta_1)$ be the vector in polar coordinates representing the deviation power $\alpha_1$ and the deviation direction (orientation) $\theta_1$ of the first wedge prism. Similarly, let $a_2 = (\alpha_2, \theta_2)$ be the vector in polar coordinates representing the deviation power $\alpha_2$ and the deviation direction (orientation) $\theta_2$ of the second wedge prism. The combined deviation $a = (\alpha, \theta)$ of the two prisms will be $$a = a_1 + a_2. \quad (3)$$

Calculating the total deviation power $\alpha$ and the deviation direction $\theta$ strictly from the polar coordinates $(\alpha_1, \theta_1)$ and $(\alpha_1, \theta_1)$ requires complicated trigonometric formulas. However, this calculation is greatly simplified if the two wedge prisms are oriented such that their deviation axes are parallel, i.e $\theta_1 = \theta_2$. In this case the deviation power of the prisms are simply added together:

$$\alpha = \alpha_1 + \alpha_2 \quad (4)$$

$$\theta = \theta_1 = \theta_2 \quad (5)$$

B. First Preferred Embodiment of the Invention

A first preferred embodiment of the invention is illustrated in FIGS. 5 through 8. With reference to FIG. 5(a), the riflescope includes a housing 30 which has an elongated hollow shape. An objective lens 1 is positioned at the front end of the housing 30. The objective lens forms a first image of the target at the objective focal plane 4. The first image formed by the objective lens is laterally reversed and upside down. The objective lens 1 has an optical axis 50 which forms the main optical axis of the riflescope. The objective optical axis 50 also defines the "aiming axis" or "line of sight" of the riflescope.

An erector lens group 16 is positioned after the objective focal plane 4 to convert the first image of the target formed by the objective lens into an upright and laterally correct second image. An eyepiece lens 5 is positioned after the erector lens group 16 at the rear end of the housing 30. The eyepiece lens 5 magnifies the second image of the target formed by the erector lens group and converts it into a virtual image for the shooter to see. The eyepiece lens has a focal plane 8.

Figure 5A:
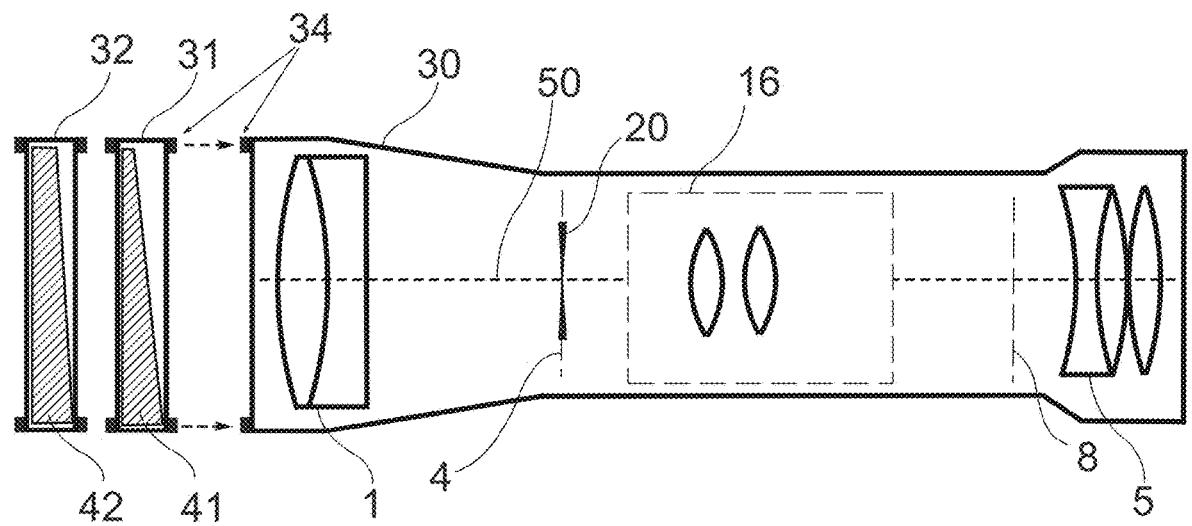
FIG. 5(a) is a side-view diagram showing a riflescope according to a first preferred embodiment of the invention. In this variation, the erector system is "focal" which means it comprises one or more lenses.
Figure 5B:
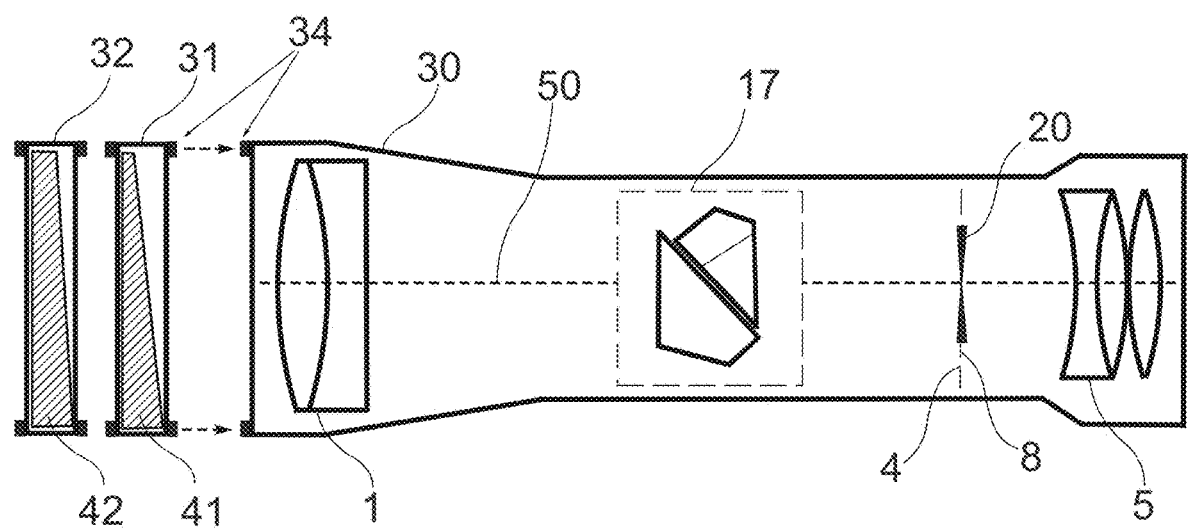
FIG. 5(b) is a side-view diagram showing a riflescope according to a first preferred embodiment of the invention. In this variation, the erector system is "afocal" which means it comprises an erecting prism such a Schmidt-Pechan prism.

FIG. 5(b) shows a variation of the riflescope wherein an erector prism 17 is used for converting the first image of the target produced by the objective into an upright and laterally-correct image. The erector prism 17 is positioned between the objective lens 1 and its focal plane 4. In this case the upright image produced by the erector prisms 17 will be positioned at the objective focal plane 4. The eyepiece focal plane 8 is also positioned at the same plane as the objective focal plane so that the eyepiece 5 will convert the real upright image formed there into a magnified and virtual image for the shooter to see. The erector prism 17 could be a Schmidt-Pechan prism, an Abbe-Koenig prism, or any other erecting prism suitable for use in a focused light beam.

For the purpose of this invention, the erector lens group 16 and the erector prism 17 constitute an image-erecting means for converting the reverse first image of the target formed by the objective lens into an upright second image. Therefore, the configurations shown in FIGS. 5(a) and 5(b) are considered equally suitable for implementing the riflescope according to the invention. The configuration shown in FIG. 5(a) is often used in hunting riflescopes because it can provide variable magnification. The configuration shown in FIG. 5(b) is preferred in combat riflesscopes where a shorter overall length is more desirable.

The riflescope according to the present invention further includes a reticle or cross hairs 20 to designate the point of aim. In FIG. 5(a), the reticle 20 is shown being positioned at the objective focal plane 4. The reticle can also be positioned at the eyepiece focal plane 8 as shown in FIG. 5(b). In either case, the shooter will see an image of the reticle superimposed on the image of the target. The reticle indicates the riflescope's "point of aim". Riflescope reticles are made in many shapes and forms including various cross-hairs patterns, a red dot (illuminated dot), a circle, a vertical post, etc. For simplicity, we assume that the aiming point shown by the reticle coincides with the main optical axis 50 of the riflescope. It is common to add auxiliary aiming marks at positions other than the optical axis to compensate for wind effect and bullet drop. Such aiming marks can be incorporated in the present invention as well. However, for brevity, we limit our description to the case where the reticle designates a single point of aim coincident with the optical axis of the riflescope.

In the riflescope according to this invention the reticle 20 is centered on the optical axis 50 and fixedly attached to the housing 30. The image-erecting means (whether implemented by the erector lens group 16 or by the erector prism 17) is also centered on the optical axis and fixedly attached to the housing 30. The reader would appreciate that the features described here differ from the prior art riflescopes wherein the reticle and the erector lens group are mounted in a tillable inner tube and their lateral position is adjustable by the user.

The riflescope according to the present invention is supplied with a set of corrector wedge prisms. Each corrector wedge prism in the set has a pre-determined deviation power between 0.05 mil and 10 mil. For example, a set of five wedge prisms with deviation powers of 0.1 mil, 0.2 mil, 0.5 mil, 1 mil and 5 mil maybe supplied with the riflescope. The wedge prisms maybe mounted in a suitable mount such that they can be attached to other prisms and to the front end of the riflescope housing. In FIGS. 5(a) and 5(b), two wedge prisms 41 and 42 are shown. The prisms are mounted in ring-shaped mounts 31 and 32 which can be attached to each other and to the front of the riflescope housing using magnetic connectors 34. FIGS. 6(a) and (b) further illustrate how a wedge prism 41 is mounted in the ring-shaped mount 31 and connected to the riflescope housing 30.

With reference to FIGS. 5(a) and 5(b), the mounts 31 and 32 together with the magnetic connectors 34 constitute a fastener means for attaching one or more wedge prisms to the front of the riflescope housing 30. Persons skilled in the art would appreciate various other possibilities for providing a fastener means suitable for this invention. For example, the prism mounts 31 and 32 may include magnets, screw threads, indents, friction surfaces, hooks, adhesive surfaces, etc. The key requirements are that (a) the deviation axes of the corrector prisms can be orientated in a plurality of pre-detrained orientations and (b) the corrector prisms are securely held in place once attached to the riflescope.

With reference to FIGS. 7 and 8, the deviation power and the deviation axis of each wedge prism is marked on its housing. These figures show the deviation powers of 2 MOA and 5 MOA printed on the prism mounts 31 and 32. The direction of each prism's deviation axis is also printed on the housing using a dot mark. The dot mark helps orient the prisms correctly when zeroing-in the riflescope. The deviation power can be printed in any suitable angular unit such as MOA, mil, "cm at 100 m" or "inches at 100 yards". The deviation axis can also be shown using any other suitable indicator or marking on the prism's housing or on the prisms.

A distinct feature of the riflescope according to the present invention is that it is turretless. As shown in FIG. 8, the riflescope housing 30 has a smooth tubular shape with an enlarged front end to house the objective lens. The rear end is also enlarged to house the eyepiece lens. The middle section is a smooth cylindrical tube with an outer diameter of 30 mm or 1 inch. Overall, the riflescope is streamlined and aesthetically pleasing.

C. Second Preferred Embodiment of the Invention

A second preferred embodiment of the invention is illustrated in FIG. 9. The riflescope according to this embodiment is the same as the one described in the first embodiment except that the prism housing 31 and the riflescope housing 30 are further equipped with a set of guide pins 71 and guide slots 70 such that the wedge prism 41 can be attached to the riflescope in a limited number of orientations. For example, in the configuration shown in FIG. 9, the deviation axis of the corrector prism 41 can be oriented in four directions (left, right, up, or down).

D. Third Preferred Embodiment of the Invention

A third preferred embodiment of the invention is illustrated in FIG. 10. The riflescope according to this embodiment is the same as the one described in the first embodiment except that the front section (the objective side) of the housing 30 has a hollow cylindrical extension 75 such that one or more wedge prisms (such as prisms 41 and 42 shown in FIG. 10) can be mounted inside it. The wedge prisms are securely held in front of the objective lens by the retainer ring 78 which is fastened onto the cylindrical extension 75 after the prisms are inserted.

In FIG. 10, the prisms 41 and 42 are shown to have markers 60 to indicate the direction of their deviation axes. The user can use these markers to orient the deviation axes of the prisms to any desired direction perpendicular to the optical axis of the riflescope. Thus, the cylindrical extension 75, the retainer ring 78 and the orientation markers 60 together provide a fastener means whereby the wedge prisms 41 and 42 are attached to the front end of the riflescope housing 30.

E. Using Achromatic Prisms

A wedge prism deviates light beams of different color at slightly different angles. This is because the refraction index n in (1) depends on the wavelength of the light ray being refracted by the prism. One can obtain the value of n for standard red (C=656 nm), green (e=546 nm) and blue (F=486 nm) wavelengths from glass manufacturers such as Schott AG of Mainz, Germany. Since the exact amount of deviation produced by a wedge prism is wavelength dependent, a certain amount of "color dispersion" or "chromatic error" will be introduced when prisms are used for deviating natural light.

With reference to FIG. 11(a), if a beam of polychromatic light passes through a wedge prism, the colors will separate (This phenomenon is highly exaggerated in FIG. 11(a) for the purpose of illustration). It is common to calculate the deviation angle α of a wedge prism at the green e wavelength. The difference between red C and blue F wavelength deviations will be considered as chromatic error.

Since the wedge prisms used in the present invention have very small deviation power, the chromatic error will be negligible. Nonetheless, chromatic error can be further reduced if an achromatic prism is used. With reference to FIG. 11(b), an achromatic prism is made of two different glass types and is characterized by two apex angles $\xi_1$ and $\xi_2$. The glasses and the apex angles are chosen such that two wavelengths (usually the red C and the blue F standard wavelengths) exit the prism at the same deviation angle. A small difference between the deviation angle of the green e wavelength and the common deviation angle of the other two wavelengths will still remain.

Achromatic prisms are well-known. Hence persons skilled in the art can easily design achromatic prisms suitable for use in the present invention.

VII. METHOD FOR ZEROING-IN A RIFLESCOPE USING ATTACHABLE WEDGE PRISMS

To use the riflescope disclosed in the present invention, the user should first mount it on his rifle. The riflescope should be mounted on top of the receiver (or barrel) such that its optical axis is in line with the axis of the barrel. Due to the dimensional variations in the mounts, the optical axis of the riflescope is rarely exactly in line with the barrel. The fact that the trajectory of a bullet does not coincide with the line of sight (which is always straight) necessitates additional corrections as well. Therefore, the user should determine if there is any correction required to align the "point of aim" shown by the riflescope with the actual "point of impact" of the rifle.

This misalignment between the point of aim and the point of impact (also called aiming error) can be determined by shooting a group of three shots at a test target located 100 m away (see FIGS. 12(a) and (b)). Once the magnitude and the direction of the aiming error is determined, the user should select one or more corrector wedge prisms supplied with the riflescope and attach them in front of the objective lens using the fastener means provided. The wedge prisms should be selected and mounted such that their combined deviation power (considered as a vector) compensates for the aiming error (see FIGS. 12(a) through (d)).

After attaching the wedge prisms, the user may fire another group of three shots at the test target to verify that his rifle shoots to the desired point of impact. If any fine tuning is needed, the user can add more corrector prisms or adjust the orientation of the attached prisms slightly. Once the rifle's zero is verified, the shooter can take his rifle to the field and use it for hunting or target shooting. The rifle will maintain its zero forever as there are no moving parts in the riflescope that can shift due to recoil or other vibrations.

The examples below further illustrate the method of zeroing-in the riflescope according to the present invention. The first example shows how to correct the point of aim of the riflescope using just a single wedge prism.

Example 1

Consider that a hunter purchases the riflescope described in the present invention and mounts it on his rifle. In the weekend, the hunter goes to the shooting range and test-fires his rifle at 100 m. He examines the point of impact on the target and determines that a correction of 15 cm along a direction of 30° measured clockwise from the vertical axis is required to zero-in the rifle (FIG. 12(a)). The hunter then contacts the manufacturer and orders a corrector prism with deviation power of $\alpha$=15 cm. He may do this conveniently over the Internet by filling in a web-based form. In just a few days, he receives a custom-made corrector prism by mail. He attaches this prism to the front of the riflescope at the direction $\theta$=30°. His rifle is now zeroed in! The hunter can take his rifle to the shooting range the next weekend and verify the rifle's zero by firing a second test group. Once the accuracy of the zero is verified, the hunter can hunt with his accurate rifle for years to come, the zero will never shift.

The next example shows how the aiming correction can be performed using two corrector prisms oriented along x or y coordinates.

Example 2

Assume that a hunter using the riflescope according to this invention determines the aiming error of his rifle in Cartesian coordinates as shown in FIG. 12(b). Assume that the required correction vector has the coordinates (x=10 cm, y=5 cm).

The hunter first selects a wedge prism with deviation power of 10 cm at 100 m (1 mil) and attaches it to the riflescope such that the deviation axis of the prism points in the x direction (vertical). He then chooses a wedge prisms with deviation power of 5 cm at 100 m (0.5 mil) and attaches it to the riflescope such that the deviation axis of the prism points in thr y direction. The riflescope is now zeroed-in. The hunter can fire a second group of three shots to verify his zero. The bullets should now hit near the center of the target.

While it is easy to use Cartesian coordinates, it is usually more efficient to zero-in the riflescope in polar coordinates. The next example shows how to zero-in the riflescope using two corrector prisms whose deviation axes are kept aligned.

Example 3

Assume that a hunter purchases the riflescope described in this invention and mounts it on his new high-quality hunting rifle. Next, he takes the rifle to the shooting range and using a steady bench rest fires three shots aiming at the center of a target located 100 m away. Upon examining the target, he determines that a hypothetical vector connecting his point of aim to the the centroid of the holes (which indicate the rifle's point of impact) is 15 cm long and has a 30 degree angle measured clockwise from the vertical axis. With reference to FIG. 12(c), this means $\alpha$=15 cm and $\theta$=30° where $\alpha$ and $\theta$ denote the magnitude and the direction of the correction vector in polar coordinates.

Once the magnitude and the direction of required correction is determined, the hunter selects two wedge prisms with deviation power of 0.5 mil (5 cm at 100 m) and 1 mil (10 cm at 100 m) from the collection of wedge prisms supplied with the riflescope. He stacks these prisms together making sure that their deviation axes are aligned. This way, the deviation power of the prisms will be simply added to create a total deviation power of 15 cm at 100 m which is the required correction magnitude. The hunter then attaches the two prisms to the front of his riflescope such that the deviation axis of the prisms is oriented at 30 degrees clockwise from the vertical axis as shown in FIG. 12(c).

The riflescope is now zeroed-in! The hunter can fire another group of three shots to verify that his rifle's point of aim is aligned with point of impact.

Example 4

Consider the scenario described in Example 3 but assume that the distance between the point of impact and the point of aim was slightly shorter. That is, let $\alpha$=13 cm and $\theta$=30°. The hunter may still use the two wedge prisms with $\alpha_1$=10 cm and $\alpha_2$=5 cm as used in Example 3 but he should now orient the deviation axes of the prisms such that $\theta_1$ is slightly more than 30° and $\theta_2$ is slightly less than 30° as shown in FIG. 12(d). By doing so, the two prisms would produce a total deviation slightly less than 15 cm. The hunter can use trial and error and adjust $\theta_1$ and $\theta_2$ such that a total deviation of 13 cm in the direction of 30° from the vertical axis is achieved.

The methods described in the examples above illustrate how the riflescope according to this invention can be zeroed-in with as few as a single wedge prism. In general, the deviation power of thin wedge prisms follow the vector addition rule described in subsection VI-A. In most practical cases, a user should be able to zero-in his rifle using one or two wedge prisms following the well-known rules of vector algebra.

VIII. ADVANTAGES OVER THE PRIOR ART

Figure 1:
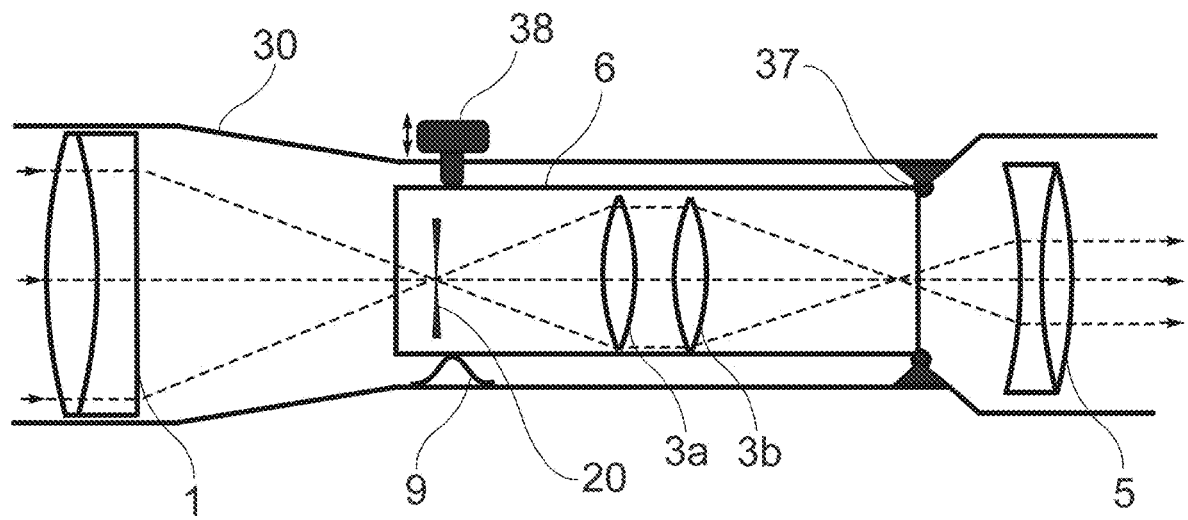
FIG. 1 is a side-view schematic showing the optical layout of existing riflescopes with internal-adjustment.
Figure 2:
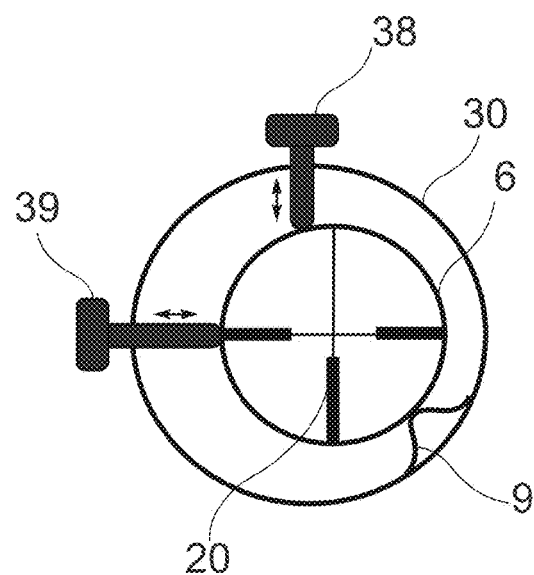
FIG. 2 is a front-view schematic showing the mechanical adjustment mechanism used in existing riflescopes.

The riflescope introduced in this invention has several significant advantages over the prior art:

1. HIGHER RELIABILITY: The riflescope according to the present invention requires no moving parts or internal adjustment mechanisms. The lenses, the reticle and the prisms are all securely attached to the housing. Therefore, there is no possibility of the point of aim shifting due to the rifle's recoil or rough usage in the field.
2. REDUCED MECHANICAL COMPLEXITY: There is no need for turrets, complex mechanical hinges, tillable inner tube, or other mechanisms which are used in a traditional riflescope to adjust the reticle.
3. HIGHER IMAGE RESOLUTION: In the prior art, the erector lenses are tilted together with the reticle so that the reticle always appears centered in the field of view. As a result, optical abberations are introduced and image quality is reduced. In the present invention, all the lenses are centered on the main optical axis. This leads to higher image resolution.
4. UNLIMITED VERTICAL AND HORIZONTAL ADJUSTMENT RANGE: In traditional riflescopes, the range of available vertical and horizontal adjustment is limited by the diameter of the tubular middle section of the riflescope body. This is because the reticle and the erector assembly are physically shifted to the sides or up-down inside the main tube (see FIGS. 1 and 2). Also, vertical and horizontal adjustments will limit each other when they are near their maximum limits (see FIG. 2). In the present invention, the total amount of available adjustment is independent of the dimensions of the riflescope's body and practically unlimited.

5. TURRETLESS BODY: In the prior art, two turrets are attached to the main body of the riflescope to allow the user adjust his point of aim for elevation and windage. The riflescope introduced in the present invention requires no turrets. The housing can be smooth and streamlined. This not only makes the scope aesthetically more pleasing but also easier to mount on a rifle. Furthermore, the smooth middle section makes it easier to attach an axillary sight (such a reflector sight) for quick aiming at close targets.

6. ADAPTABLE DESIGN: In the prior art, the turret mechanism must be designed such that the reticle is shifted by a predetermined amount per each click (i.e. graduation of the turrets). This amount depends on the focal length of the objective lens. Therefore, if a manufacturer makes several riflescope models with various objective diameters and magnifications, it may need to re-design the turret mechanism for each model to maintain the same adjustment resolution (e.g. 0.1 mil per click). In the riflescope introduced in the present invention, the adjustment to the point of aim is provided by wedge prisms which are mounted in front of the objective. Therefore, the amount and the direction of adjustments are independent of the optical characteristics of the optical elements which are mounted after the prisms. Same sets of prisms can be used for any riflescope with any magnification and objective focal length. This feature significantly reduces design and manufacturing costs.

IX. CONCLUSION, RAMIFICATIONS, AND SCOPE

The foregoing disclosure is believed to be sufficient to enable an ordinary person skilled in the art to build and use the invention. In addition, the description of specific embodiments will so fully reveal the general nature of the invention that others can, by applying current knowledge, readily modify and/or adapt for various applications such specific embodiments without undue experimentation and without departing from the generic concept. For example:

1. The corrector wedge prisms of the present invention can be combined with previous mechanisms and techniques proposed by the present author for adjusting the point of aim in a riflescope. This includes the mechanisms and techniques disclosed in U.S. Pat. No. 8,749,887 issued on Jun. 10, 2014, U.S. Pat. No. 9,164,269 issued on Oct. 20, 2015, and U.S. Pat. No. 9,644,620 issued on May 9, 2017. For instance, one may use the teachings disclosed in the present invention to make large adjustments (more than 5 MOA) to the point of aim if required. The mechanisms disclosed in the patents mentioned above could then be reserved for making fine adjustments (less than 5 MOA). Limiting those mechanisms to small adjustments would simplify their design and reduce unwanted optical abberations.
2. It is possible to use gradient-index (also called graded-index) optical elements to provide a deviating optical device similar to a wedge prism. For the purposes of this invention, a gradient-index "prism" will be considered equivalent to a conventional wedge prism and maybe used as a substitute.
3. The methods of zeroing-in a riflescope described in Section VII can be adapted to any optical weapon sight that superimposes a reticle pattern on an image of the target. This includes various types of reflex (reflector) sights such as red-dot sights and holographic sights.
4. The steps required to perform the methods of zeroing-in a riflescope described in Section VII can be performed by a human user or by a machine (i.e. robotic device). For example, a robotic device used in an assembly line can mount the telescopic device on a rifle, measure its aiming error using an optical bore sighter and attach a required number of prisms to correct the riflescope's point of aim.

Therefore, such adaptations and modifications should and are intended to be comprehended within the meaning and range of equivalents of the disclosed embodiments.

It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art. Thus, the scope of the invention should be determined by the appended claims and their legal equivalents, as opposed to the embodiments illustrated.

What is claimed is:
1. A riflescope, comprising:
   a. a housing, said housing having a front end, a rear end and a middle section,
   b. an objective lens that forms a first image of a target, said objective lens being mounted inside said housing at a front end of said housing, said objective lens having an optical axis and a focal plane;
   c. an image-erecting means for converting said first image of the target into an upright second image of the target, said image-erecting means being mounted inside said housing after said objective lens;
   d. an eyepiece lens that converts said second image of the target into a virtual image of the target viewable by a shooter, said eyepiece lens being mounted after said image-erecting means, said eyepiece lens being mounted inside said housing at a rear end of said housing, said eyepiece lens having a focal plane;
   e. a reticle that designates a point of aim, said reticle being mounted either at the focal plane of said objective lens or at the focal plane of said eyepiece lens, an image being superimposed on the virtual image of the target;
   f. a collection of wedge prisms, each said wedge prism in said collection including a deviation power of a certain amount, each said wedge prism in said collection having a deviation axis which is a hypothetical axis that points from an apex of said wedge prism towards a base of said wedge prism;
   g. a fastener means for attaching at least one wedge prism of the collection of wedge prisms to a front end of said housing such that
      i. the wedge prisms of the collection are positioned before said objective lens;
      ii. light rays that enter said objective lens pass through the wedge prisms of the collection;
      iii. the deviation axes of the collection of wedge prisms are orientable to a plurality of specified directions perpendicular to the optical axis of the objective lens; and iv. the wedge prisms of the collection are fixedly attached to said housing whereby the point of aim denotes the riflescope corrected to correspond to a point of impact of a rifle associated with the riflescope.

2. The riflescope of claim 1 further comprising said reticle is fixedly attached to said housing.

3. The riflescope of claim 1 further comprising each said wedge prism of said collection is installed in a mount having markings denoting the amount of deviation power.

4. The riflescope of claim 1 further comprising each said wedge prism of said collection is installed in a mount having markings denoting the deviation axis.

5. The riflescope of claim 1 further comprising the middle section of said housing having a streamlined cylindrical form with no attached turrets.

6. The riflescope of claim 1 further comprising said wedge prisms of said collection having the certain amount of the deviation power having a power amount selected from the group consisting of: 0.1 mil, 0.2 mil, 0.5 mil, 1 mil, 2 mil, 5 mil, and 10 mil.

7. The riflescope of claim 1 further comprising said wedge prisms of said collection having the certain amount of the deviation power having a power amount selected from the group consisting of: 0.5 MOA, 1 MOA, 2 MOA, 5 MOA, 10 MOA, 20 MOA, and 60 MOA.

8. The riflescope of claim 1 wherein the wedge prisms are achromatic.

* * * * *